US012637642B2

(12) United States Patent
Li

(10) Patent No.: US 12,637,642 B2
(45) Date of Patent: May 26, 2026

(54) FERMENTATION DEVICE

(71) Applicant: Junhui Li, Dongguan (CN)

(72) Inventor: Junhui Li, Dongguan (CN)

( * ) Notice: Subject to any disclaimer, the term of this patent is extended or adjusted under 35 U.S.C. 154(b) by 690 days.

(21) Appl. No.: 18/189,330

(22) Filed: Mar. 24, 2023

(65) Prior Publication Data

US 2023/0323260 A1 Oct. 12, 2023

(30) Foreign Application Priority Data

Apr. 12, 2022 (CN) .......................... 202210380281.2

(51) Int. Cl.
*C12C 13/10* (2006.01)
*C12C 11/00* (2006.01)
(52) U.S. Cl.
CPC ............ *C12C 13/10* (2013.01); *C12C 11/006* (2013.01)
(58) Field of Classification Search
CPC .............................. C12C 13/10; C12C 11/006
See application file for complete search history.

(56) References Cited

U.S. PATENT DOCUMENTS

2024/0191162 A1* 6/2024 Sáenz-Díez Muro ... C12G 1/02

FOREIGN PATENT DOCUMENTS

CN 203256254 U * 10/2013

OTHER PUBLICATIONS

CN203256254U—Translation (Year: 2025).*

* cited by examiner

*Primary Examiner* — Elizabeth M Kerr
*Assistant Examiner* — Keith Brian Assante
(74) *Attorney, Agent, or Firm* — JEEN IP LAW, LLC

(57) ABSTRACT

The present invention relates to the technical field of fermentation apparatus, in particular a fermentation device, including an insulating jacket, a fermentation tank, a base, a top connector, a headstock, a bottom connector, and a return pipe. The insulating jacket is provided with an upper and a lower perforation respectively, the top connector projects to the outside of the insulating jacket via the upper perforation, and the bottom connector projects to the outside of the insulating jacket via the lower perforation. An upper convergence chamber, flow channels, and a lower convergence chamber are provided between the insulating jacket and the fermentation tank. The present invention has the advantages of a simple structure, small volume, low cost, heat exchange liquid in direct contact with the fermentation tank, large heat exchange area, good heat exchange effect, high efficiency, easy control of the temperature of the fermentation tank, and convenient cleaning.

10 Claims, 6 Drawing Sheets

FERMENTATION DEVICE

FIELD OF THE INVENTION

The present invention relates to the technical field of fermentation apparatus and refers in particular to a fermentation device.

BACKGROUND OF THE INVENTION

Beer is one of the three most popular beverages in the world and is also the most popular drink in summer. Traditionally, beer is made from barley malt, hops, and water as the main raw materials, and the wort is liquefied by saccharification and fermented with yeast to produce a low-alcoholic beverage full of carbon dioxide. Due to its low alcohol content and richness in nutrients, it is commonly known as a "liquid bread".

Subject to the development of the beer industry, especially the development of industrial refrigeration technology, lower-cost raw materials, and high-concentration dilution process, the large-scale production of breweries has reached the extreme, resulting in the production cost has been greatly reduced. Specifically, in the fermentation process, mainly large vertical or horizontal fermentation tanks are used, and these fermenters use metal-welded jacket refrigeration to control the temperature to achieve a stable ideal fermentation temperature and stable quality. In terms of raw materials, the use of malt in addition to the use of rice, corn starch, sugar syrup, cane sugar, hop infusion products, and other raw materials significantly reduces the cost. In terms of the production process, the production process of using high-concentration wort fermentation and dilution mixing with deoxygenated water at a later stage, in order to multiply the output, improve the equipment utilization rate, and also reduce the production cost of beer. Due to the above technology and process, the industrial scale of beer, the price is extremely advantageous, making the refreshing lager beer become the mainstream product in the market.

However, due to excessive competition among breweries, the quality of the beer is significantly reduced in order to reduce costs, as evidenced by the use of sugary ingredients other than malt, and an increasing proportion of them, making beer more and more bland and monotonous in taste, in addition to being refreshing. In addition, to increase the shelf life of beer, most beer must be filtered, bottled, and then pasteurized, which makes the beer taste less fresh. This single variety of industrial beer is increasingly unable to meet the needs of those people who most seek high quality, rich and unique taste.

As a result, many companies have sprung up to produce on a small scale, using whole malt as much as possible, breeding all kinds of new hops to enhance flavor, and also using other flavorings such as various fruits and herbs to enhance flavor, and in many cases using ale yeast for high-temperature fermentation, which industrial beers are not too fond of, resulting in a wide variety of various flavored beers to enrich everyone's choice. At the same time, many of these craft beers don't use pasteurization to increase shelf life, but keep some of the fresh yeast and drink it while it is fresh to pursue a more extreme taste, and this fresh beer usually needs to be stored at low temperatures. Such a beer culture first developed in the United States and gradually spread around the world. In recent years, China has also seen the emergence of a variety of craft brands, and the development of craft beer has slowly moved from the niche to the forefront.

In addition to those who have established their own craft brew brands, there is a growing number of individual beer enthusiasts who are also trying to brew their own beer at home with simple equipment. These homebrews use whole malt and a variety of specialty malts, a variety of rich grain hops, other flavorings, and fermented ale yeast to create personalized beers. These beers are not only consumed by themselves but also shared with friends and family. It has become a fashionable hobby in places like the United States. With the arrival of the craft brewing trend, more and more people in China will try their hand at this type of home-brewed beer.

These individually brewed beers, while perhaps inconsistent in taste, impress those who taste them with their strong malt aroma, multiple layers of rich hop flavor, various estery and sour flavors from the ale yeast, and unique flavors from other flavoring substances, and most importantly, an extremely fresh taste.

Therefore, for these micro and small manufacturers as well as individual home brewing enthusiasts, the market has provided micro and small, economical brewing equipment to meet their needs. At present, in the conventional micro and small fermentation tanks on the market, refrigeration mainly uses internal and external metal coils or auxiliary heat transfer materials, and uses water-cooled (containing liquids such as alcoholic water) or refrigerant for direct refrigeration; disadvantages are: Small cooling area, slow cooling; among them, the way of using the internal coils is not convenient for cleaning, there is a sanitary dead end, need to be manually removed and cleaned separately; the way of using the external coils has a small contact area, the cooling effect is poor; and the use of compressor cooling equipment, the weight is relatively large, each equipment needs to be equipped with a separate cooling unit with high cost. Therefore, the shortcomings are very obvious, and there is an urgent need to provide a solution.

SUMMARY OF THE INVENTION

In order to solve the above technical problems, the purpose of the present invention is to provide a fermentation device.

In order to achieve the above purpose, the present invention uses the following technical solution: A fermentation device comprising an insulating jacket, a fermentation tank installed in said insulating jacket, a base mounted on the bottom of the insulating jacket, a top connector connected to the top opening of the fermentation tank, a headstock set in the top connector, a bottom connector connected to the bottom opening of the fermentation tank, and a return pipe sandwiched between the outer wall of the fermentation tank and the inner wall of the insulating jacket; the top and bottom of the said insulating jacket being respectively opened with an upper and a lower perforation, said top connector protrudes through the upper perforation to the outside of the insulating jacket, said bottom connector protrudes through the lower perforation to the outside of the insulating jacket, said headstock is located outside the insulating jacket, said bottom connector is provided with an opening at the bottom end, between said inner wall of the insulating jacket and the outer wall of the fermentation tank are enclosed to form an upper convergence chamber, a flow channel, and a lower convergence chamber, said upper convergence chamber, flow channel, and lower convergence chamber are sequentially connected, the number of said flow channels is a plurality, and the plurality of flow channels are distributed in a circular array around the central axis of the fermentation tank, the bottom of said insulating jacket is opened with a liquid inlet hole and a return hole, said liquid inlet hole is connected to the lower convergence chamber, the top of said return pipe is connected to the upper convergence chamber, the bottom of said return pipe is sealingly connected to the return hole or sealingly penetrates the return hole.

Further, said insulating jacket includes an upper insulating jacket and a lower insulating jacket, said upper insulating jacket and said lower insulating jacket are hermetically coupled, said upper perforation is located at the top of said upper insulating jacket and said lower perforation is located at the bottom of said lower insulating jacket, said upper insulating jacket and said lower insulating jacket envelop said fermentation tank.

Further, said upper insulating jacket includes an upper convergence part and an upper sleeve connected to the upper convergence part, said inner wall of the upper convergence part is enclosed with the top of the fermentation tank to form an upper convergence chamber, said inner wall of the upper sleeve is provided with a plurality of upper runner recesses and a plurality of upper convex surfaces, the plurality of upper runner recesses are respectively spaced with the plurality of upper convex surfaces, the top of the plurality of upper runner recesses are connected with the upper convergence chamber, the plurality of upper runner recesses are distributed in a circular array around the central axis of the fermentation; said lower insulating jacket includes a lower convergence part and a lower sleeve connected to the lower convergence part, said inner wall of the lower convergence part is enclosed with the bottom of the fermentation tank to form the lower convergence chamber, said inner wall of the lower sleeve is provided with a plurality of lower runner recesses and a plurality of lower convex surfaces, the plurality of lower runner recesses are respectively spaced with the plurality of lower convex surfaces, the bottom ends of the plurality of lower runner recesses are connected to the lower convergence chamber, the bottom ends of the plurality of upper runner recesses are connected to the top ends of the plurality of lower runner recesses respectively, the plurality of upper convex surfaces and the plurality of lower convex surfaces are in close contact with the outer wall of the fermentation tank, and the plurality of upper runner recesses, the plurality of lower runner recesses and the outer wall of the fermentation tank are enclosed to form a plurality of flow channels.

Further, said upper insulating jacket further comprises an upper conical section, said upper convergence part is connected to the upper sleeve via the upper conical section, said upper conical section has a plurality of upper diversion recesses recessed in the inner wall, said plurality of upper diversion recesses are respectively connected to the plurality of upper runner recesses one by one, said upper diversion recesses and the top conical section of the fermentation are enclosed to form an upper diversion channel, said top end of the flow channel is connected to the upper convergence chamber via the upper diversion channel.

Further, said lower insulating jacket further comprises a lower conical section, said lower convergence part is connected to the lower sleeve via the lower conical section, said inner wall of said lower conical section is recessed with a plurality of lower diversion recesses, the plurality of lower diversion recesses are respectively connected to the plurality of lower runner recesses one by one, said lower diversion recesses and the bottom conical section of the fermentation are enclosed to form a lower diversion channel, said bottom end of the flow channel is connected to the lower convergence chamber via the lower diversion channel.

Further, the inner wall of the said insulating jacket is recessed with a return flow groove and said return pipe is located in the return flow groove.

Further, the open end of the upper insulating jacket is sealingly connected to the open end of the lower insulating jacket by a sealing structure.

Further, said headstock is provided with a gas inlet fitting, a beer outlet fitting, and an exhaust pressure retaining valve, said beer outlet fitting is connected with a beer outlet pipe, said the beer outlet pipe protrudes into the fermentation tank.

Further, a thermometer is provided at the bottom of the said fermentation tank, one end of said thermometer protrudes into the fermentation tank, and said opening is connected with an elbow, inspection glass, or/and valve.

Further, the top of the insulating jacket is provided with a carrying handle, and the carrying handle is provided with a handle hole and an avoidance opening; the bottom of the base is provided with a plurality of casters.

The beneficial effects of the present invention include: in practical application, heat exchange fluid (cooling fluid or heating fluid) is introduced into the lower convergence chamber through the liquid inlet hole, the lower convergence chamber plays the role of diversion, and as the heat exchange fluid in the lower convergence chamber increases, the heat exchange fluid will rise along multiple flow channels until the plurality of flow channels flow the heat exchange fluid to the upper convergence chamber, and the upper convergence chamber plays the role of pooling and the heat exchange fluid in the upper convergence chamber flows back to the outside of the insulating jacket through the return pipe. In the process of heat exchange liquid flow, the heat exchange liquid in the plurality of flow channels directly contacts with the side wall of the fermentation tank, which has a large heat exchange area, high heat exchange efficiency, and good heat exchange effect, and effectively controls the temperature of the fermentation tank. In addition, when the flow channels need to be cleaned, it is only necessary to pass the cleaning liquid into the liquid inlet hole, and the cleaning liquid is convenient by the opening to discharge the liquid from the fermentation tank. Therefore, the present invention is with the advantages of a simple structure, small size, low cost, heat exchange fluid directly in contact with the fermentation tank, large heat exchange area, good heat exchange effect, high efficiency, easy control of the temperature of the fermentation tank, and easy to clean.

DESCRIPTION OF THE PREFERRED EMBODIMENTS

For a better understanding of those skilled in the art, the present invention is further described below in conjunction with the embodiments and accompanying drawings, and references to the embodiments are not intended to limit the present invention.

Figure 1:
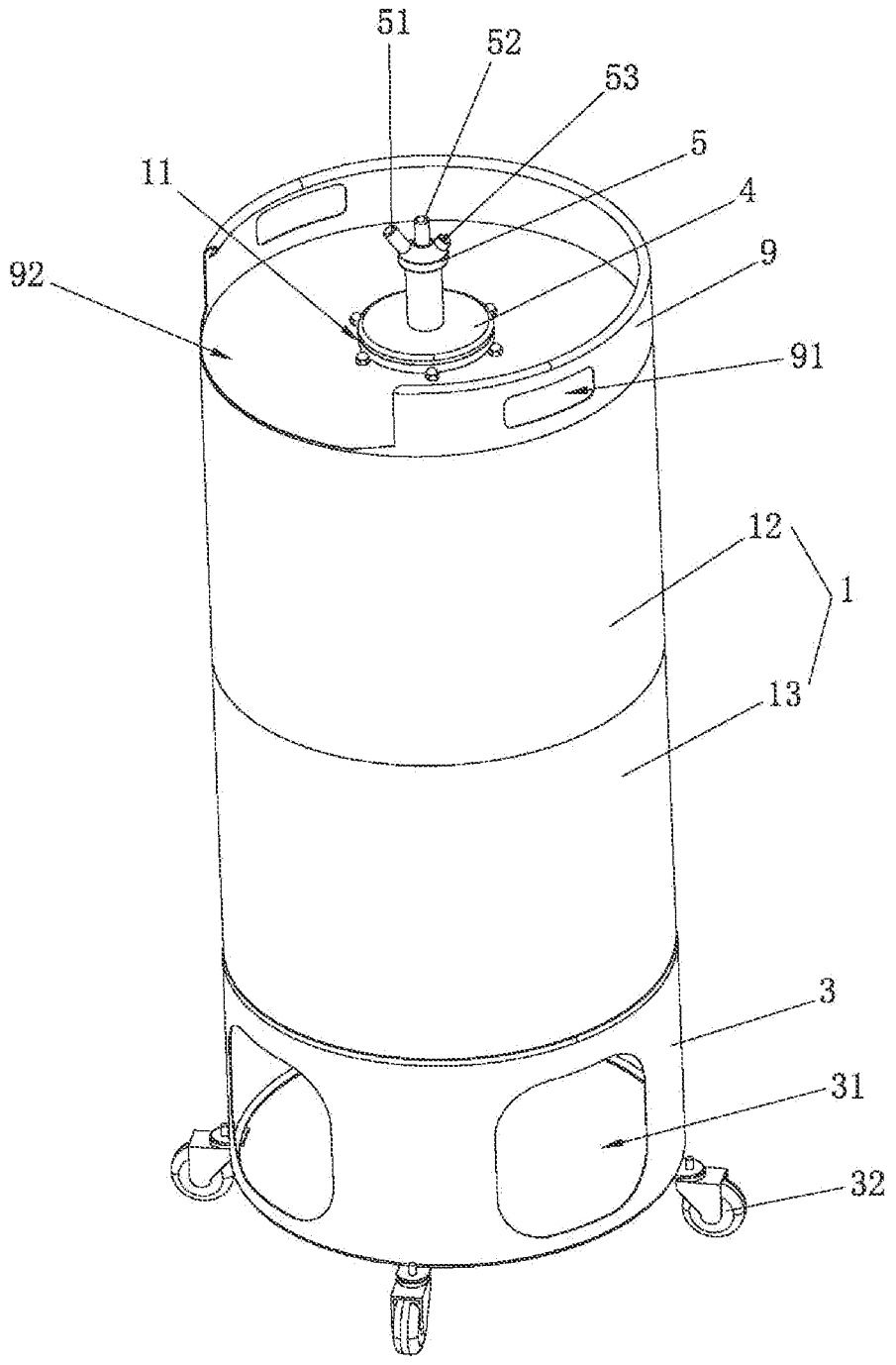
FIG. 1 is a schematic diagram of the three-dimensional structure of the present invention.
Figure 2:
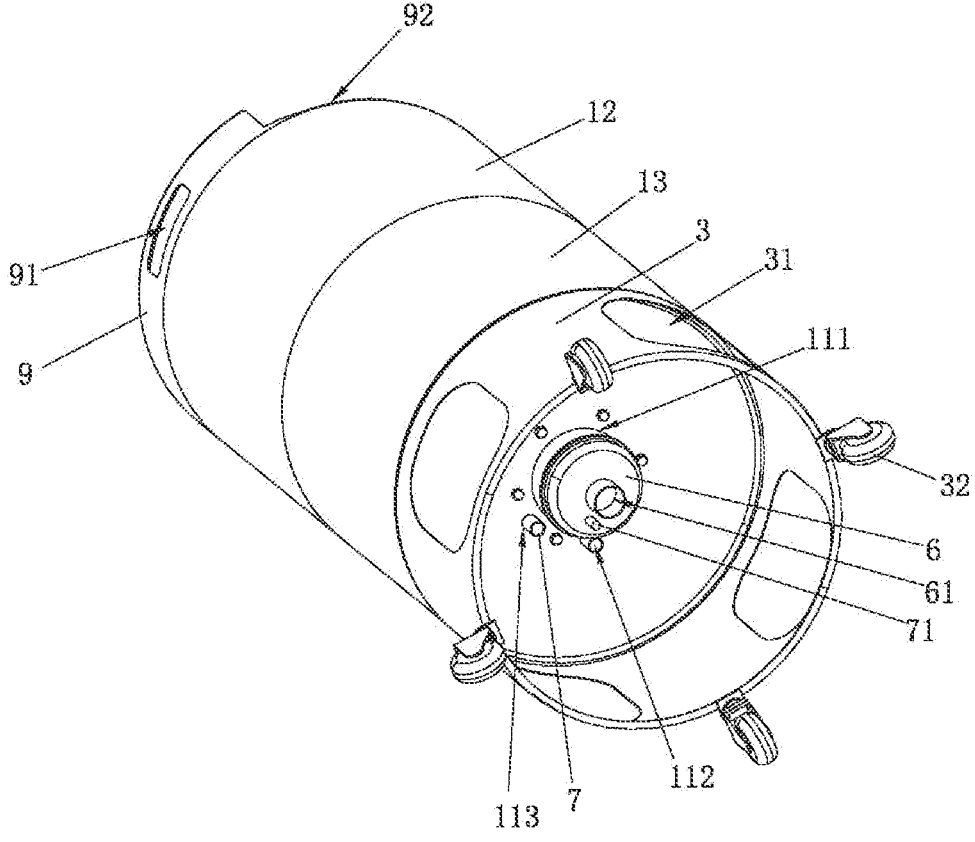
FIG. 2 is a schematic diagram of the three-dimensional structure of the present invention from another viewpoint.
Figure 3:
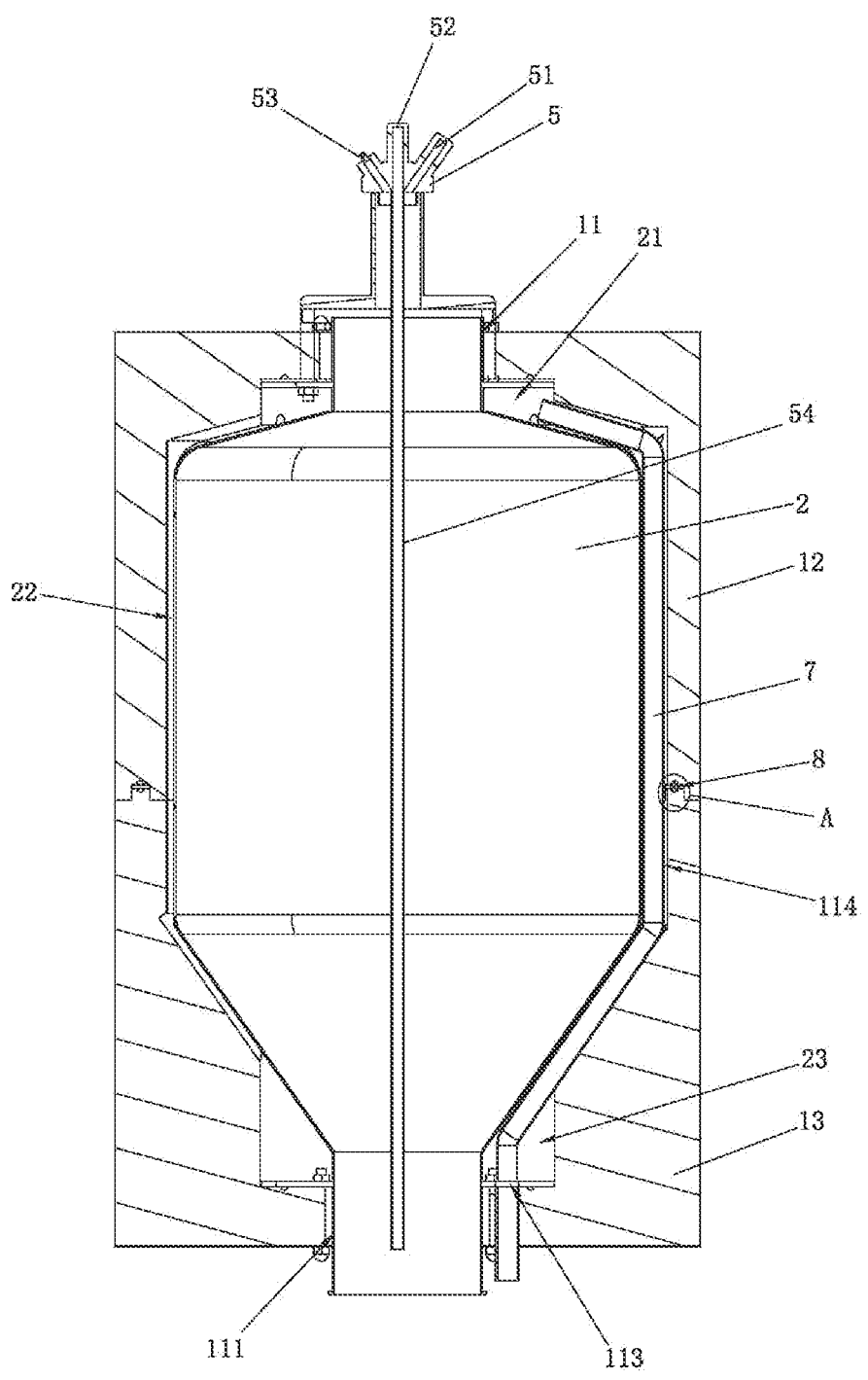
FIG. 3 is a cross-sectional view of the present invention after hiding the base and the carrying handle.
Figure 4:
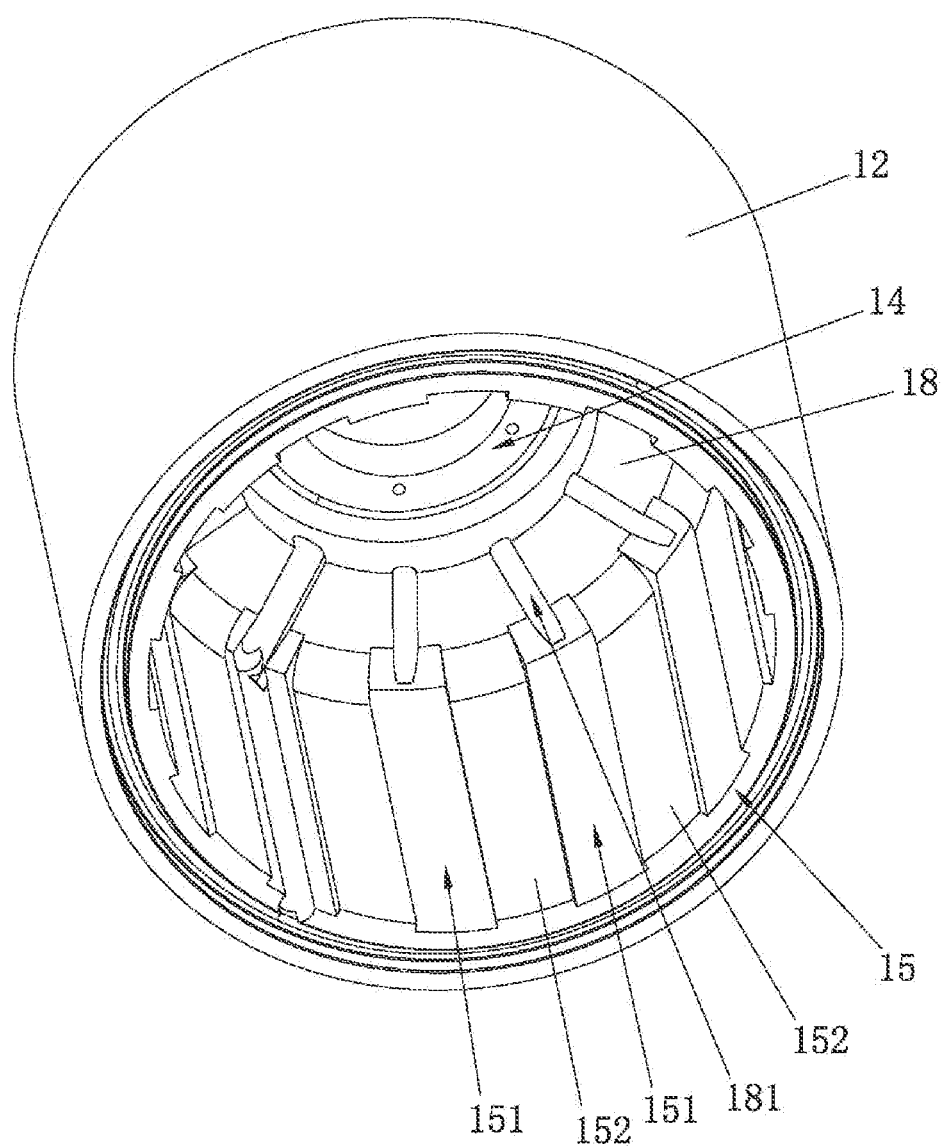
FIG. 4 is a schematic diagram of the three-dimensional structure of the upper insulating jacket of the present invention.
Figure 5:
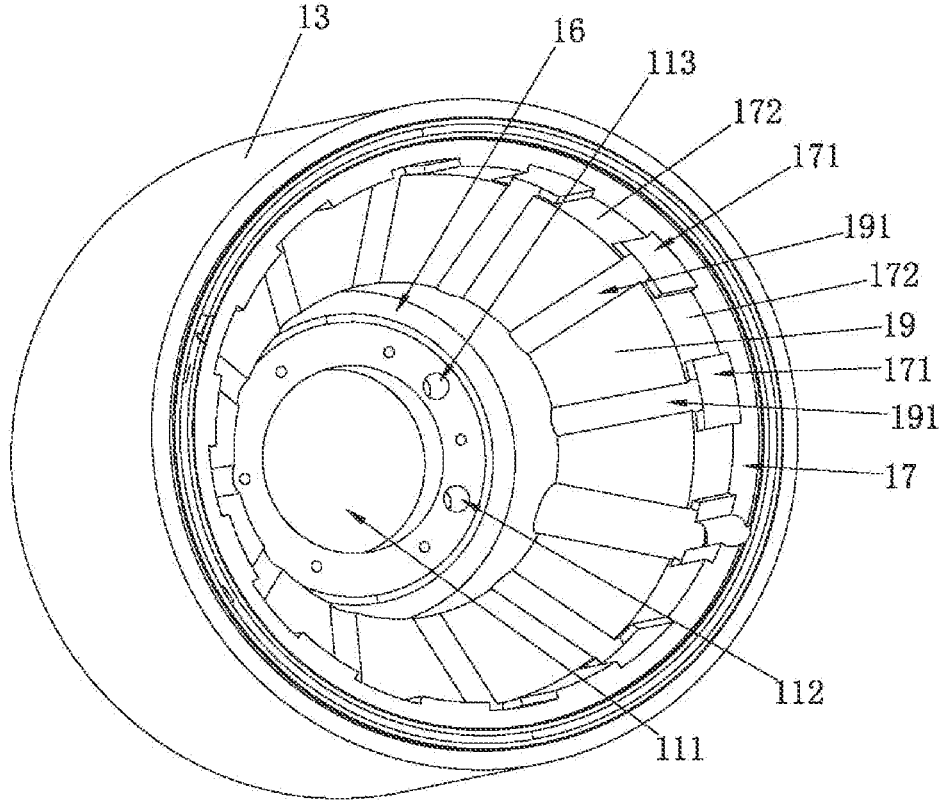
FIG. 5 is a schematic diagram of the three-dimensional structure of the lower insulating jacket of the present invention.
Figure 6:
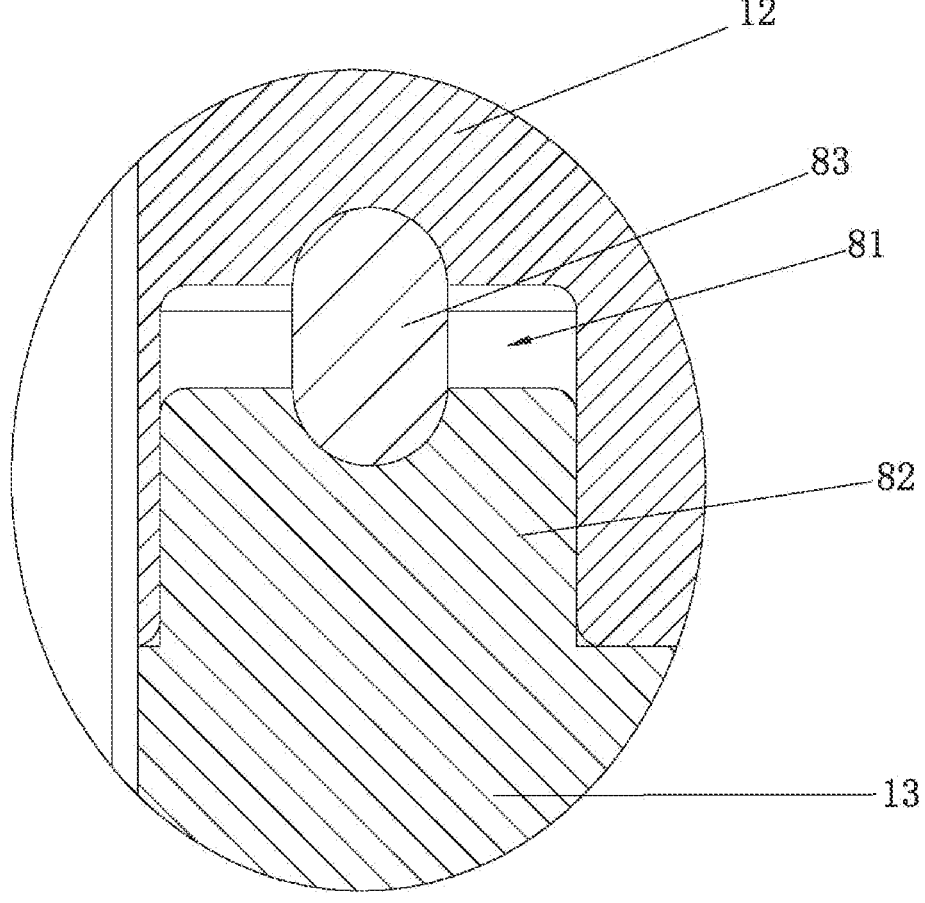
FIG. 6 is an enlarged view at A in FIG. 3.

As shown in FIGS. 1 to 6, the present invention provides a small-scale fermentation device suitable for beer fermentation, comprising an insulating jacket 1, a fermentation tank 2 installed in said insulating jacket 1, a base 3 mounted on the bottom of the insulating jacket 1, a top connector 4 connected to the top opening of the fermentation tank 2, a headstock 5 set in the top connector 4, a bottom connector 6 connected to the bottom opening of the fermentation tank 2, and a return pipe 7 sandwiched between the outer wall of the fermentation tank 2 and the inner wall of the insulating jacket 1, said top and bottom of the insulating jacket 1 are provided with an upper perforation 11 and a lower perforation 111 respectively, said top connector 4 projects outside the insulating jacket 1 through the upper perforation 11, said outer wall of the top connector 4 is fixedly sealed to the insulating jacket 1 through the upper flange so that the fermentation tank 2 is fixedly connected to the insulating jacket 1, and said bottom connector 6 projects outside the insulating jacket 1 through the lower perforation 111, the outer wall of said bottom connector 6 is fixedly sealed to the insulating jacket 1 through the lower flange so that the fermentation tank 2 is fixedly connected to the insulating jacket 1, said headstock 5 is located outside the insulating jacket 1, the bottom end of said bottom connector 6 is provided with an opening 61, the inner wall of said insulating jacket 1 and the outer wall of the fermentation tank 2 are enclosed to form an upper convergence chamber 21, a flow channel 22, and a lower convergence chamber 23, said upper convergence chamber 21, flow channel 22 and lower convergence chamber 23 are sequentially connected, the number of flow channels 22 is plurality, the plurality of flow channels 22 are distributed in a circular array around the central axis of fermentation tank 2, said bottom of insulating jacket 1 is opened with a liquid inlet hole 112 and a return hole 113, said liquid inlet hole 112 is connected with lower convergence chamber 23, said return pipe 7 is connected to the upper convergence chamber 21 at the top, the bottom of the said return pipe 7 is sealingly connected to the return hole 113 or is sealingly penetrated through the return hole 113; specifically, said top connector 4 is fixedly connected to the top of the insulating jacket 1 by bolts, and said bottom connector 6 is fixedly connected to the bottom of the insulating jacket 1 by bolts.

In practical application, the heat exchange fluid (cooling fluid or heating fluid) is passed into the lower convergence chamber 23 through the liquid inlet hole 112, the lower convergence chamber 23 plays the role of diversion, and as the heat exchange fluid in the lower convergence chamber 23 increases, the heat exchange fluid will rise along the plurality of flow channels 22 until the plurality of flow channels 22 flow the heat exchange fluid to the upper convergence chamber 21, the upper convergence chamber 21 plays the role of pooling, and the heat exchange fluid in the upper convergence chamber 21 flows back to the outside of the insulating jacket 1 via the return pipe 7. In the process of heat exchange fluid flow, the heat exchange fluid in the plurality of flow channels 22 directly contacts the side wall of the fermentation tank 2, which has a large heat exchange area, high heat exchange efficiency, and good heat exchange effect, and effectively controls the temperature of the fermentation tank 2. In addition, when the flow channels 22 need to be cleaned, it is only necessary to pass the cleaning liquid into the liquid inlet hole 112, which is convenient for cleaning. The liquid in the fermentation tank 2 can be discharged (discharging yeast and performing operations such as CIP reflux) by the opening 61. The simple structure, small size, and low cost of the present invention, direct contact of heat exchange liquid with fermentation tank 2, large heat exchange area, good heat exchange effect and high efficiency, easy temperature control of fermentation tank 2, and convenient cleaning, all of the above can meet the needs of craft breweries and beer lovers. Of course, according to the actual demand, more than one of the fermentation devices can share a set of refrigeration systems for supplying heat exchange liquid, which reduces production and uses cost.

Specifically, the said fermentation tank 2 is made of stainless steel material, which has a long service life; the said insulating jacket 1 is made of EPP (polypropylene foam) material, which is a recyclable environmental protection material with a good insulation effect while having good toughness and strength, can play a role of buffer protection to the fermentation tank 2 in a transporting process, eliminating the way of using conventional welding jacket, not only save the materials of the metal jacket or coil, while reducing the follow-up work brought about by weldings, such as polishing, pickling, and other processes, which can correspondingly reduce the wall thickness, thereby reducing the weight and reduce the cost of construction.

In this embodiment, said insulating jacket 1 includes an upper insulating jacket 12 and a lower insulating jacket 13, said upper insulating jacket 12 and lower insulating jacket 13 are sealingly connected together, said upper perforation 11 is located at the top of upper insulating jacket 12, said lower perforation 111 is located at the bottom of lower insulating jacket 13, and said upper insulating jacket 12 and lower insulating jacket 13 envelop the fermentation tank 2. The structure is designed to facilitate the disassembly, maintenance, and cleaning of the upper insulating jacket 12 and the lower insulating jacket 13, and to facilitate the manufacture of the upper insulating jacket 12 and the lower insulating jacket 13, reducing the cost of production.

In this embodiment, said upper insulating jacket 12 includes an upper convergence part 14 and an upper sleeve 15 connected to the upper convergence part 14, said inner wall of the upper convergence part 14 and the top of the fermentation tank 2 are enclosed to form the upper convergence chamber 21, said inner wall of the upper sleeve 15 is provided with a plurality of upper runner recesses 151 and a plurality of upper convex surfaces 152, the plurality of upper runner recesses 151 being spaced apart from the plurality of upper convex surfaces 152, respectively. The top of the plurality of upper runner recesses 151 are connected to the upper convergence chamber 21, and the plurality of upper runner recesses 151 are distributed in a circular array around the central axis of the fermentation tank 2; said lower insulating jacket 13 includes a lower convergence part 16 and a lower sleeve 17 connected to the lower convergence part 16, and the inner wall of said lower convergence part 16 and the bottom of the fermentation tank are enclosed to form the lower convergence chamber 23, and the inner wall of said lower sleeve 17 is provided with a plurality of lower runner recesses 171 and a plurality of lower convex surfaces 172, the plurality of lower runner recesses 171 being spaced apart from the plurality of lower convex surfaces 172, respectively, the bottom ends of the plurality of lower runner recesses 171 are connected to the lower convergence chamber 23, and the bottom ends of the plurality of upper runner recesses 151 are respectively connected to the top ends of the plurality of lower runner recesses 171 one by one, the plurality of upper convex surfaces 152 and the plurality of lower convex surfaces 172 are in close contact with the outer wall of the fermentation tank 2 respectively, and the plurality of upper runner recesses 151, the plurality of lower runner recesses 171, and the outer wall of the fermentation tank 2 are enclosed to form the plurality of flow channels 22. The structure design not only realizes that the upper insulating jacket 12 and lower insulating jacket 13 are in close contact with the outer wall of the fermentation tank 2, but also forms a plurality of flow channels 22, so that the heat exchange fluid can directly contact with the fermentation tank 2 with good heat exchange effect.

In this embodiment, said upper insulating jacket 12 also includes upper conical section 18, said upper convergence part 14 is connected to upper sleeve 15 via upper conical section 18, said diameter of said upper conical section 18 gradually increases from top to bottom, said inner wall of said upper conical section 18 is recessed with a plurality of upper diversion recesses 181, the plurality of upper diversion recesses 181 are respectively connected to the plurality of upper runner recesses 151 one by one, said upper conical section 18 is in close contact with the top conical section of fermentation tank 2, said upper diversion recesses 181 and the top conical section of fermentation tank 2 are enclosed to form an upper diversion channel, and the top of said flow channel 22 is connected to the upper convergence chamber 21 via the upper diversion channel. By providing the upper diversion channel, the heat exchange fluid is diverted to facilitate the convergence of the heat exchange fluid to the upper convergence chamber 21.

In this embodiment, said lower insulating jacket 13 also includes lower conical section 19, said lower convergence part 16 is connected to lower sleeve 17 via lower conical section 19, said diameter of said lower conical section 19 gradually increases from top to bottom, said inner wall of said lower conical section 19 is recessed with a plurality of lower diversion recesses 191, the plurality of lower diversion recesses 191 are respectively connected to the plurality of lower runner recesses 171 one by one, said lower conical section 19 is in close contact with the low conical section of fermentation tank 2, said lower diversion recesses 191 and the low conical section of fermentation tank 2 are enclosed to form a lower diversion channel, and the bottom of said flow channel 22 is connected to the lower convergence chamber 23 via the lower diversion channel. In this structure design, the heat exchange liquid in the lower convergence chamber 23 is separately diverted to the plurality of flow channels 22 through the plurality of lower diversion channels with a good diversion effect.

In this embodiment, the inner wall of said insulating jacket 1 is recessed with a return flow groove 114, and said return pipe 7 is located in the return flow groove 114. This structure design makes the insulating jacket 1, the return pipe 7, and the fermentation tank 2 compact and small in size. Specifically, said return flow groove 114 is located in one of the flow channels 22.

In this embodiment, the open end of the upper insulating jacket 12 and the open end of the lower insulating jacket 13 are hermetically connected by a sealing structure 8. In this structure design, the upper insulating jacket 12 and the lower insulating jacket 13 are well sealed together which can avoid the leakage of heat exchange fluid.

Specifically, said sealing structure 8 includes a sealing groove 81, a sealing projection 82, an insert groove recessed from the bottom or top wall of the sealing groove 81 or/and from the top surface of the sealing projection 82, and a sealing ring 83 embedded in the insert groove; when the sealing groove 81 is provided at the open end of the upper insulating jacket 12, the sealing projection 82 is provided at the open end of the lower insulating jacket 13; when the sealing projection 82 is provided at the open end of the upper insulating jacket 12, the sealing groove 81 is provided at the open end of the lower insulating jacket 13; said sealing projection 82 and sealing groove 81 are fitted by concave and convex, so that the joint surface of the upper insulating jacket 12 and the lower insulating jacket 13 is flat and without obvious gaps; said sealing ring 83 is used to seal the gap between the upper insulating jacket 12 and the lower insulating jacket 13. The structure design has a good sealing effect, and the disassembly and maintenance of the upper insulating jacket 12 and the lower insulating jacket 13 are convenient.

Specifically, said headstock 5 and top connector 4 are connected together by means of a threaded connection or snap connection, which facilitates the disassembly, maintenance, and replacement of the headstock 5; when the headstock 5 is removed, the top connector 4 can be fitted with a CIP cleaning ball or with a dry pitching hop port, said dry pitching hop port being a snapping interface, which facilitates the installation of a manual butterfly valve and facilitates the addition of $CO_2$-protected granulated hops under pressure; the top connector 4 can be provided with a pressure interface to facilitate the addition of a pressure gauge, which facilitates the observation of the internal pressure of the fermentation tank 2.

In this embodiment, said headstock 5 is provided with a gas inlet fitting 51, a beer outlet fitting 52, and an exhaust pressure retaining valve 53, said beer outlet fitting 52 is connected with a beer outlet pipe 54, said beer outlet pipe 54 protrudes into the fermentation tank 2. The gas inlet fitting 51 facilitates the carbonic acid operation by passing $CO_2$ into the fermentation tank 2; the beer outlet fitting 52 and the beer outlet pipe 54 facilitate the operator to take the beer; the exhaust pressure retaining valve 53 relieves the pressure of the fermentation tank 2 to achieve the effect of pressure-keeping.

In this embodiment, the bottom of said fermenter 2 is provided with a thermometer 71, one end of said thermometer 71 protrudes into the fermentation tank 2 and the other end of said thermometer 71 protrudes outside the bottom of the insulating jacket 1 for real-time temperature detection of the fermentation tank 2 and easy observation of the temperature inside the fermentation tank 2; said opening 61 is connected with an elbow, inspection glass, or/and valve for operations such as discharging yeast and performing CIP reflux.

In this embodiment, the top of the insulating jacket 1 is provided with a carrying handle 9, and the carrying handle 9 is provided with a handle hole 91 and an avoidance opening 92; the number of the handle hole 91 is two, which are symmetrically provided in the carrying handle 9, and the handle hole 91 is convenient for manual lifting of the device; the avoidance opening 92 is convenient for the operator to disassemble or replace the headstock 5, etc.; the bottom of the base 3 is provided with a plurality of casters 32, which is convenient for the movement of the device.

Specifically, one or more perforations 31 are provided on the side wall of said base 3. The perforations 31 facilitate the operator to disassemble or replace the corresponding structures (e.g., pipe, elbow, inspection glass, etc.) on the opening 61.

The size of this fermentation device is small which has a good effect on temperature control of fermentation tank 2, to ensure the stability of the fermentation temperature, not only to facilitate the realization of hot wort rapid cooling, save the use of the wort cooling equipment, reduce the chances of wort contamination, but also convenient for warming operation, conducive for the insulation fermentation during winter or under the low temperature, convenient to achieve warming diacetyl reduction, can also be used as wort plus lactic acid bacteria acidification fermentation apparatus. The bottom of said fermentation tank 2 is a large conical angle cone, which is convenient for collecting and discharging yeast and discharging dry pitch hops and other flavor substances. Said fermentation tank 2 can be used as a beer storage tank to facilitate the user to perform carbonation operation of $CO_2$, the dry pitch of hops, taking beer, etc. Said fermentation tank 2 has a moderate volume and height, occupies a small area, does not require a separate countertop for placement, is ergonomic for various operations, and thus can be flexibly transported, placed, and used, and is suitable for use in all kinds of locations except those requiring human lifting.

This fermentation device has the following use scenarios: Scenario 1.

For commercial craft breweries, after a number of fermentation devices are CIP cleaned and the produced hot wort is filled into cans, sealed, and transported while still hot to the transfer stations or points of sale, which is equipped with a refrigeration system for supplying heat exchange fluid. After adjusting the hot wort to a specific temperature at the transfer stations or points of sale and filling it with sterile air or oxygen, yeast is added for fermentation, and operations such as fermentation, yeast discharge, and dry hop pitching are performed according to the fermentation process. When the main fermentation is finished, the top connector 4 is replaced with a sterilized clean headstock 5 for secondary fermentation and refrigeration, or $CO_2$ can be added for gas fermentation. After the beer is matured, it can be taken and drunk directly on this fermentation device or proceed with the secondary filling for sale. After the beer is sold out, the fermentation device can be transported back to the factory and cleaned for use again.

In this scenario, the need for production sites for craft breweries can be reduced, i.e., craft breweries can only equip the saccharification equipment and do not need to equip the back-end fermentation and other equipment, which can reduce the initial investment cost and build the plant flexibly. At the same time, the hot wort is sealed for transportation, which can reduce the chance of wort contamination with bacteria.

Scenario 2.

For commercial craft breweries, after producing wort and conducting pre-fermentation (primary fermentation) in their own plants, the young beer after primary fermentation is filled into the fermentation tank 2 of this fermentation device that is cleaned by CIP cleaning for secondary fermentation. The secondary fermentation can be done at the plant, transfer station, or sales point for secondary fermentation or gas fermentation. After the beer is matured, it can be taken and drunk directly on this fermentation device or proceed with the secondary filling for sale. After the beer is sold out, the fermentation device can be transported back to the factory and cleaned for use again.

In this scenario, it is possible to reduce the occupied tank time of the fermentation tank 2 and sake tank of the craft brew manufacturer by at least half, which can increase the equipment utilization rate by more than 50% and help reduce production costs.

Scenario 3.

For craft breweries, because this fermentation device is small, occupies a small area, and the refrigeration system used to supply the heat exchange fluid is separate from this fermentation device, it can be quickly connected, the beer is fresh, has a long shelf life, and can be dispatched directly to individual user households, cooperative outlets or businesses, allowing for flexible operation. It can bring extremely fresh and high-quality beer to consumers as well as reasonable promotion according to the business model.

Scenario 4.

For individual craft beer enthusiasts, hot wort made by saccharification equipment or purchased wort concentrate, obtained by diluting, heating, and adding hops to boil the wort, is cooled down and then filled into the fermentation tank 2 of this fermentation device after cleaning and disinfection, or the high-temperature hot wort can be filled directly into the fermentation tank 2, and the fermentation tank 2 is cooled down to the set temperature through the insulating jacket 1. Then yeast is added for fermentation, and from fermentation to finished beer, all that needs to be done in between is to collect or discharge yeast and other sediments, dry pitch hops, etc. So, the operation is very simple.

This fermentation device has a high degree of professionalism, high functional integration, and long service life, is easy to use, reduces homebrewing work intensity, and also increases the quality assurance of beer, the experience will be greatly enhanced.

Scenario 5.

This fermentation device is not limited to beer fermentation, other fermentation processes that require biological temperature control can be carried out by this device or in a similar mode as in the scenario above, including but not limited to wine, cider, homemade carbonated beverages, etc. It can also be used as an insulated container, such as cola, lime juice, mung bean soup, etc. This fermentation device can be used both as cold-holding equipment and as insulated equipment.

Scenario 6.

This fermentation device can also be used as experimental or teaching equipment. By replacing different functional structures on the top connector 4 and bottom connector 6, different functions can be realized, and it can be widely used in scientific research institutes, and pharmaceutical and food fields.

Scenario 7.

By installing a heater on the bottom connector 6 of this fermentation device, the liquid in the fermentation tank 2 can be heated so that this fermentation device can be used as a hot water tank. If a distillation condensing tower is installed on the top connector 4, it can be used as a small distillation equipment for the production of distilled spirits such as whiskey.

All the technical features In this embodiment can be freely combined according to practical needs.

The above embodiment is a preferred embodiment of the present invention, in addition, the present invention can be realized in other ways, and any obvious substitution is within the scope of protection of the present invention without departing from the premise of the present technical solution.

What is claimed is:

1. A fermentation device, is characterized in that: it comprises an insulating jacket, a fermentation tank installed in said insulating jacket, a base mounted on the bottom of the insulating jacket, a top connector connected to the top opening of the fermentation tank, a headstock set in the top connector, a bottom connector connected to the bottom opening of the fermentation tank and a return pipe sandwiched between the outer wall of the fermentation tank, and the inner wall of the insulating jacket; the top and bottom of the said insulating jacket being respectively opened with an upper and a lower perforation, said top connector protrudes through the upper perforation to the outside of the insulating jacket, said bottom connector protrudes through the lower perforation to the outside of the insulating jacket, said headstock is located outside the insulating jacket, said bottom connector is provided with an opening at the bottom end, between said inner wall of the insulating jacket and the outer wall of the fermentation tank are enclosed to form an upper convergence chamber, a flow channel, and a lower convergence chamber, said upper convergence chamber, flow channel, and lower convergence chamber are sequentially connected, the number of said flow channels is a plurality, and the plurality of flow channels are distributed in a circular array around the central axis of the fermentation tank, the bottom of said insulating jacket is opened with a liquid inlet hole and a return hole, said liquid inlet hole is connected to the lower convergence chamber, the top of said return pipe is connected to the upper convergence chamber, the bottom of said return pipe is sealingly connected to the return hole or sealingly penetrates the return hole.

2. The fermentation device according to claim 1, is characterized in that: said insulating jacket includes an upper insulating jacket and a lower insulating jacket, said upper insulating jacket and said lower insulating jacket are hermetically coupled, said upper perforation is located at the top of said upper insulating jacket and said lower perforation is located at the bottom of said lower insulating jacket, said upper insulating jacket and said lower insulating jacket envelop said fermentation tank.

3. The fermentation device according to claim 2, is characterized in that: said upper insulating jacket includes an upper convergence part and an upper sleeve connected to the upper convergence part, said inner wall of the upper convergence part is enclosed with the top of the fermentation tank to form an upper convergence chamber, said inner wall of the upper sleeve is provided with a plurality of upper runner recesses and a plurality of upper convex surfaces, the plurality of upper runner recesses are respectively spaced with the plurality of upper convex surfaces, the top of the plurality of upper runner recesses are connected with the upper convergence chamber, the plurality of upper runner recesses are distributed in a circular array around the central axis of the fermentation; said lower insulating jacket includes a lower convergence part and a lower sleeve connected to the lower convergence part, said inner wall of the lower convergence part is enclosed with the bottom of the fermentation tank to form the lower convergence chamber, said inner wall of the lower sleeve is provided with a plurality of lower runner recesses and a plurality of lower convex surfaces, the plurality of lower runner recesses are respectively spaced with the plurality of lower convex surfaces, the bottom ends of the plurality of lower runner recesses are connected to the lower convergence chamber, the bottom ends of the plurality of upper runner recesses are connected to the top ends of the plurality of lower runner recesses respectively, the plurality of upper convex surfaces and the plurality of lower convex surfaces are in close contact with the outer wall of the fermentation tank, and the plurality of upper runner recesses, the plurality of lower runner recesses and the outer wall of the fermentation tank are enclosed to form a plurality of flow channels.

4. The fermentation device according to claim 2, is characterized in that: said upper insulating jacket further comprises an upper conical section, said upper convergence part is connected to the upper sleeve via the upper conical section, said upper conical section has a plurality of upper diversion recesses recessed in the inner wall, said plurality of upper diversion recesses are respectively connected to the plurality of upper runner recesses one by one, said upper diversion recesses and the top conical section of the fermentation are enclosed to form an upper diversion channel, said top end of the flow channel is connected to the upper convergence chamber via the upper diversion channel.

5. The fermentation device according to claim 2, is characterized in that: said lower insulating jacket further comprises a lower conical section, said lower convergence part is connected to the lower sleeve via the lower conical section, said inner wall of said lower conical section is recessed with a plurality of lower diversion recesses, the plurality of lower diversion recesses are respectively connected to the plurality of lower runner recesses one by one, said lower diversion recesses and the bottom conical section of the fermentation are enclosed to form a lower diversion channel, said bottom end of the flow channel is connected to the lower convergence chamber via the lower diversion channel.

6. The fermentation device according to claim 1, is characterized in that: the inner wall of the said insulating jacket is recessed with a return flow groove and said return pipe is located in the return flow groove.

7. The fermentation device according to claim 2, is characterized in that: the open end of the upper insulating jacket is sealingly connected to the open end of the lower insulating jacket by a sealing structure.

8. The fermentation device according to claim 1, is characterized in that: said headstock is provided with a gas inlet fitting, a beer outlet fitting, and an exhaust pressure retaining valve, said beer outlet fitting is connected with a beer outlet pipe, said the beer outlet pipe protrudes into the fermentation tank.

9. The fermentation device according to claim 1, is characterized in that: a thermometer is provided at the bottom of the said fermentation tank, one end of said thermometer protrudes into the fermentation tank, and said opening is connected with an elbow, inspection glass, or/and valve.

10. The fermentation device according to claim 1, is characterized in that: the top of the insulating jacket is provided with a carrying handle, and the carrying handle is provided with a handle hole and an avoidance opening; the bottom of the base is provided with a plurality of casters.

* * * * *